Figure 3:
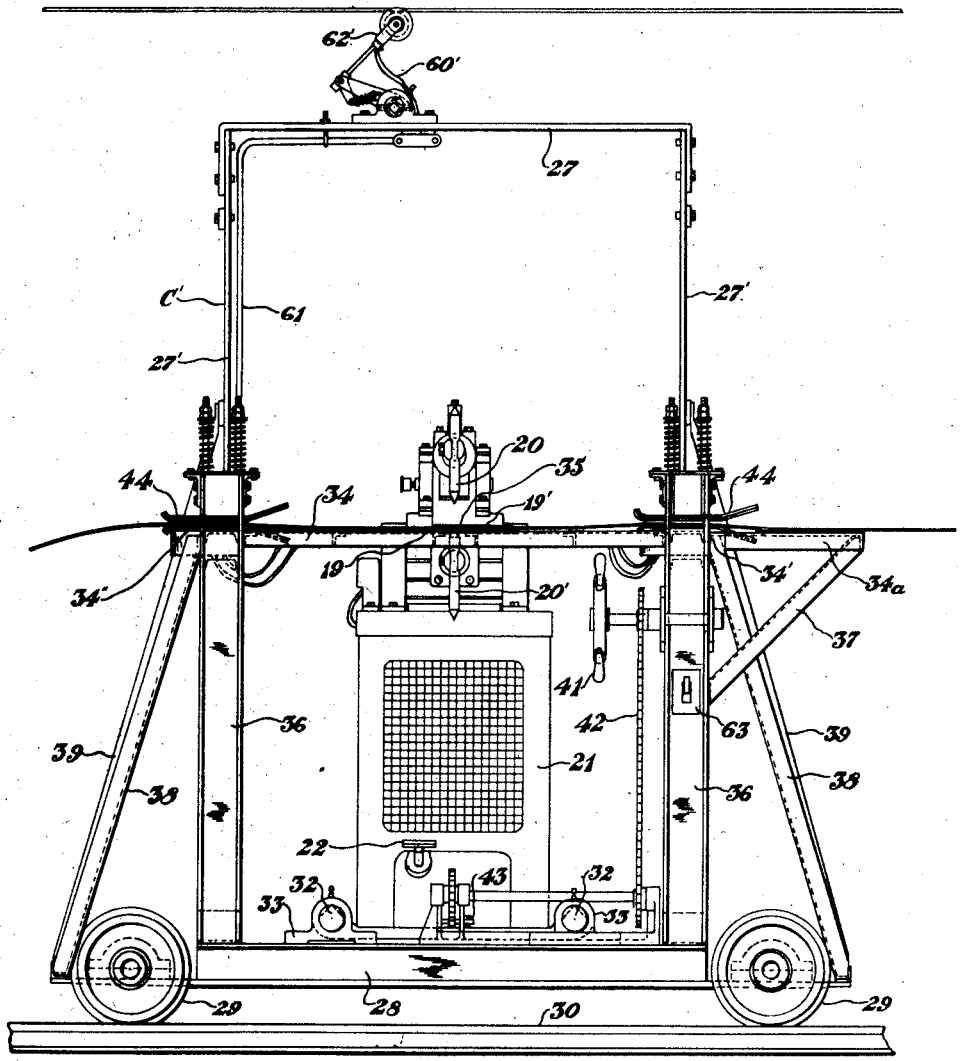

Dec. 11, 1928.                                        1,694,555
            H. M. NAUGLE ET AL
              WELDING MACHINE
         Filed Sept. 18, 1926        5 Sheets-Sheet 1
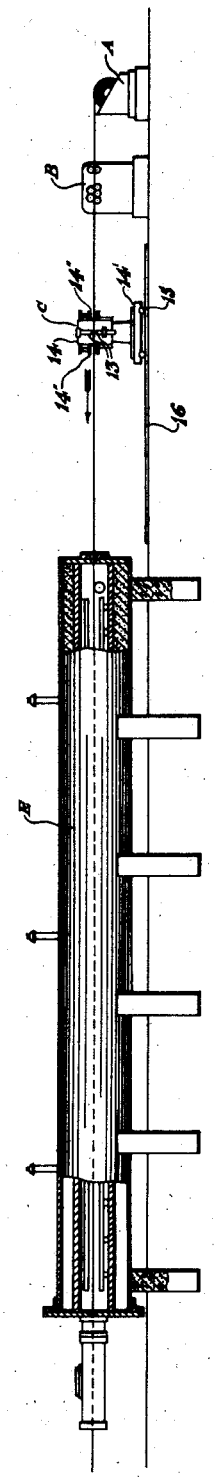
Inventors
H. M. Naugle and
A. J. Townsend
By
       Attorneys

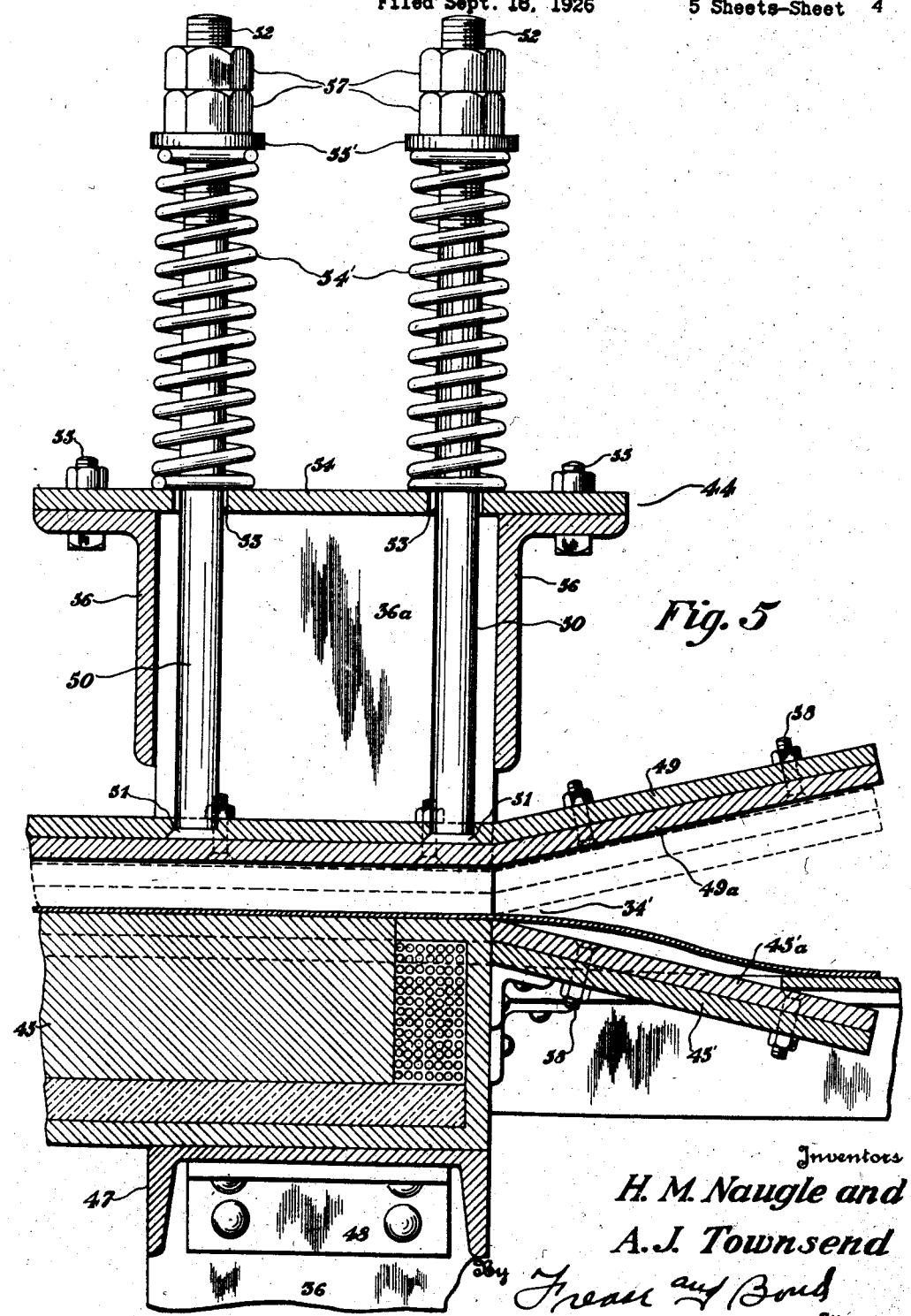

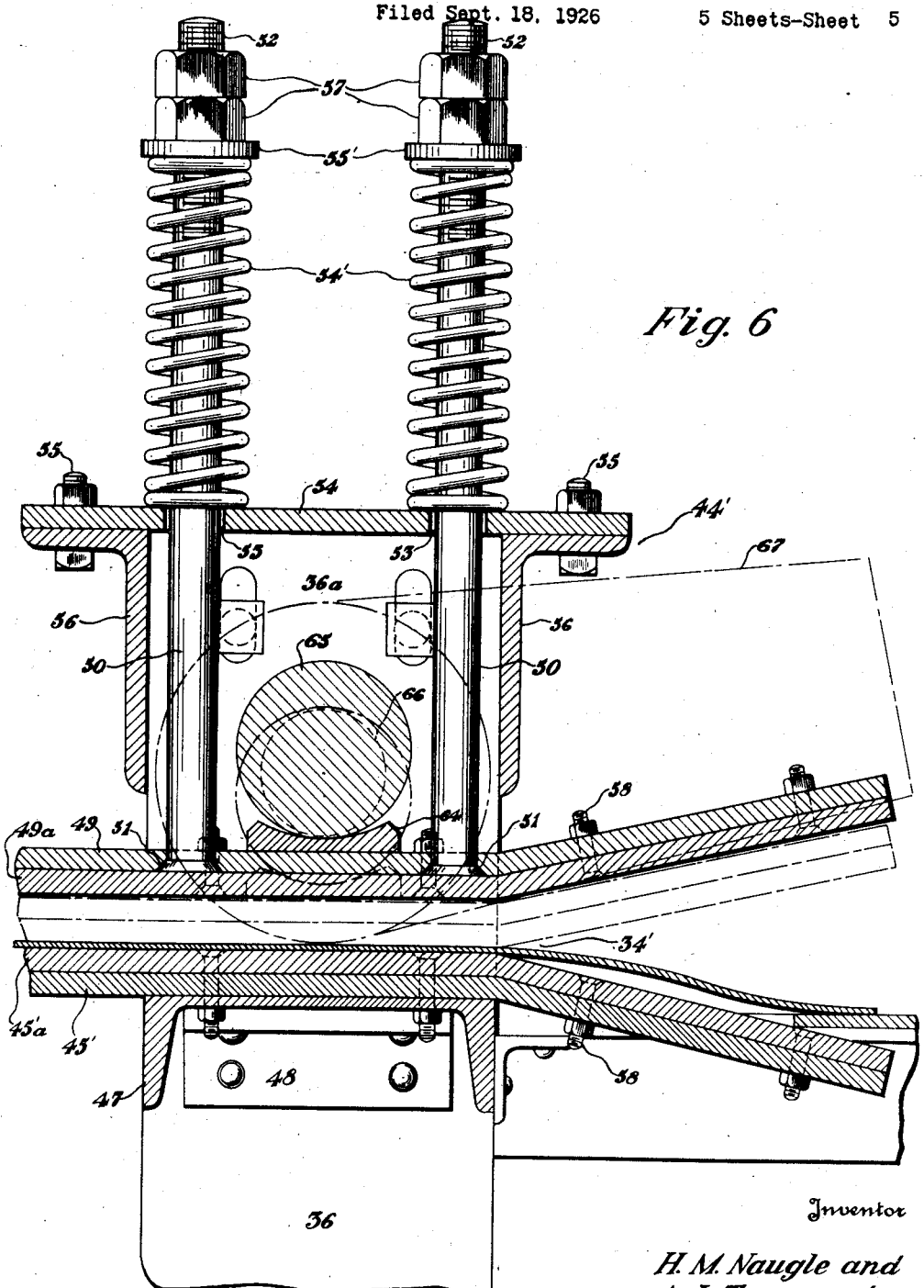

Patented Dec. 11, 1928.

1,694,555

UNITED STATES PATENT OFFICE.

HARRY M. NAUGLE AND ARTHUR J. TOWNSEND, OF CANTON, OHIO, ASSIGNORS, BY MESNE ASSIGNMENTS, TO THE COLUMBIA STEEL COMPANY, OF PITTSBURGH, PENNSYLVANIA, A CORPORATION OF PENNSYLVANIA.

WELDING MACHINE.

Application filed September 18, 1926. Serial No. 136,360.

The invention relates to apparatus for welding the laminations or the overlapped ends of continuously moving strips and the like, in connection with the manufacturing operations of hot or cold rolled strip mills and the like; application being a continuation in part of the common subject matter of our pending application filed November 17, 1924, Serial No. 750,271, and our pending application filed July 1, 1925, Serial No. 40,739.

One object of the present improvements has been set forth in each of the above applications wherein a spot welder is illustrated and described, including a set of electrodes mounted in a frame supported on a carriage provided with wheels riding on a track, together with gripping devices on the front and rear sides of the frame, for clamping or holding the overlapped ends of successive strips in position between the electrodes for a spot welding operation while the carriage is traveling forward on the track.

Such means for clamping and holding a welding machine mounted upon wheels riding on a track, to the overlapping ends of successive moving strips, or moving the machine, is desirable and necessary in connection with the continuous operations of hot or cold rolled strip mills, and in the continuous annealing and continuous pickling processes set forth in the said applications for patent; to avoid any stopping of the continuous movement of the strip.

A plurality of spot welds, or a seam or a projection weld extending across the overlapped ends of a steel strip, is rendered necessary or desirable in a continuous annealing operation, because of the thermal strains to which the weld is subjected by the annealing heating; as well as in a continuous pickling operation, because of the mechanical strains to which the weld may be subjected by a twisting or a turning of the strip through the pickling bath.

Moreover, in dealing with black stock having a scale thereon, the presence of the scale on the overlapped ends of the strips may lessen the strength of a single spot weld, and require a plurality of welds for security; and when dealing with the thicker or heavier strips for a pickling thereof, a plurality of spot welds is also necessary or desirable.

For these reasons, a further object of the present improvement is to provide for a transverse movement of the welding electrodes across a moving strip, especially while the welding machine is moving longitudinally in the direction of motion of the strip as a consequence of the welding machine having been clamped to the strip as aforesaid.

These and other objects may be attained by the use of the construction and arrangement hereafter described, and illustrated in the accompanying drawings forming part hereof, in which—

Figure 1 is a more or less conventional side elevation partly in section of one form of improved welding machine as heretofore set forth in the aforesaid mentioned applications, in conjunction with other apparatus for continuous annealing;

Fig. 2, a more or less conventional side elevation, partly in section, of a modified and preferred embodiment of the invention provided with means for transversely moving spot welding electrodes across the longitudinally moving strip, in connection with other apparatus for continuous pickling.

Fig. 3, a side elevation of the preferred embodiment of the invention as aforesaid;

Figure 4:
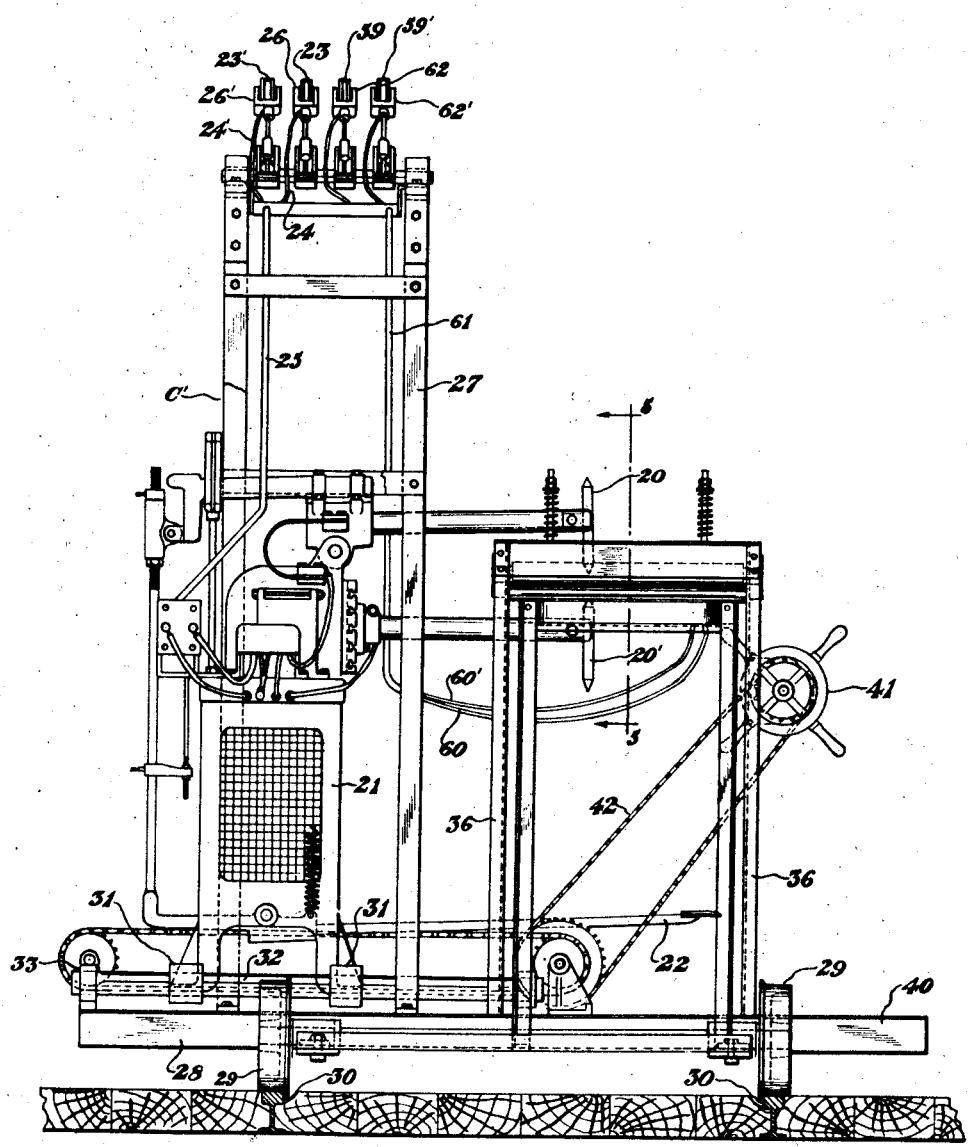

Fig. 4, a rear end elevation thereof;

Fig. 5, an enlarged vertical cross section thereof illustrating the strip gripping mechanism as on line 5—5, Fig. 4; and Fig. 6, an enlarged vertical cross section similar to Fig. 5, illustrating a modified form of hand-operated strip gripping mechanism.

Similar numerals refer to similar parts throughout the drawings.

The apparatus illustrated in Fig. 1 may include an improved traveling spot welder C in proper series arrangement with a coil box A, a strip leveler B, and an electric heating furnace E and other elements for continuous annealing as set forth in the aforementioned applications.

The spot welder C may include a set of electrodes 13 mounted in a frame 14 supported on a carriage 14' provided with wheels 15 riding on a track 16 together with gripping devices 14" on the front and rear sides of the frame for clamping and holding successive strips with their ends overlapped in position between the electrodes for a spot welding operation while the carriage is being drawn along the track by reason of its being clamped to the strips.

The preferred embodiment of the invention as a component element in an apparatus for continuous pickling, is illustrated more or less conventionally in Fig. 2, and may include a coil box A, a strip leveler B, a preferred traveling spot welder C', a pickling tank G, a washing tank H, and suitably located supporting rolls R.

The spot welder C' may include a set of electrodes 20 and 20' operatively mounted in a well known manner in a frame 21 enclosing and provided with the usual transformers, switches and electric connections, and may have a foot pedal 22 for causing the electrodes 20 and 20' to approach each other and apply pressure to overlapping strip ends 19 and 19' and the like, which may be suitably placed between the electrodes, thereby suitably timing the resistance welding circuit thus set up; the welder C' being connected to power line trolley wires 23 and 23' by lead wires 24 and 24' leading from the welder through a conduit 25 to trolleys 26 and 26' suitably mounted upon a trolley frame 27 secured to a traveling carriage frame 28 upon which the welder frame 21 is likewise mounted.

The traveling carriage frame 28 is provided with a set of flange wheels 29 suitably journaled thereon for riding to and fro on track rails 30, which may be referred to as a reciprocating movement.

The spot welder frame 21 is mounted for transverse movement upon the carriage frame 28, as by the collar feet 31 slidably mounted upon the transversely extending slide bars 32 preferably spaced above the frame 28 and secured thereto by supports 33.

A welding table 34 is suitably spaced between the electrodes 20 and 20' and is provided with a transversely extending central slot 35 for permitting welding operation of the electrodes, which table is mounted upon the carriage frame 28 as by means of the channel legs 36.

The table 34 may be provided with a receiving end extension 34ᵃ suitably secured thereto and braced to the legs 36 as by means of diagonal struts 37. The table legs 36 and the uprights 27' of the trolley frame 27 may be provided with suitable diagonal brace struts 38 and 39 connecting them with the carriage frame 28.

To provide a platform 40 upon which an operator for the traveling welder may stand, the carriage frame 28 preferably extends transversely beyond the table.

Control means convenient to the operator for transversely moving the welder frame 21 upon which the electrodes are operatively mounted, and which is itself carried upon feet 31 slidably mounted upon the transverse bars 32, may include a hand wheel 41 mounted upon one of the table legs 36 and operatively connected with the welder frame 21 as by means of chain belt and sprocket gearing 42 secured to the welder frame as by clamp 43 connecting the frame to one of the chains of the gearing.

At both the strip receiving and delivery ends 34' and 34" of the table 34, strip gripping mechanisms indicated generally at 44 are provided, and which include stationary bottom grip electro-magnets 45 and plates 45' secured at the level of the table 34 upon transverse table end channels 47, which are connected to the legs 36 as by angle brackets 48.

Upper gripping plates 49 are operatively mounted above the stationary magnets 45 as by means of upwardly extending guide bars 50, secured at their lower ends 51, as by upsetting to plates 49, and being provided with threaded upper ends 52. The guide bars 50 extend through guide apertures 53 in a cross plate 54 secured as by bolts 55 and angles 56 to extensions 36ᵃ of the table legs 36 projecting a suitable distance above the upper level of the table.

Spring supporting means for the guide bars 50 are provided, which may include compression springs 54' abutting at their lower ends the lower surface of the cross plate 54, and at their upper ends the washers 55', strung upon the bolts. Nuts 57 screwed upon the threaded upper ends 52 of the bolts, abut upon the other sides of the washers 55' for supporting the bolts and for providing a variable compression of the springs.

The gripping plates 45' and 49 may be provided with removable face plates 45'ᵃ and 49ᵃ secured to the plates 45' and 49 as by means of countersunk bolts 58.

The electro-magnets 45 are connected to power line trolley wires 59 and 59' by lead wires 60 and 60' extending from the welder through a conduit 61 to trolleys 62 and 62' suitably mounted upon the trolley frame 27, and a suitable magnet control switch 63 is provided in the circuit for energizing and de-energizing the magnets as desired.

The operation and use of the traveling welder C may be described as follows: A strip being subjected to a continuous annealing process and passing from the coil box A through the strip leveler B, the welder C, the solution washer B, the furnace E and the other elements of the apparatus as set forth in said previous applications for patent, progresses through the apparatus until it has been entirely unwound from one coil in the coil box A; and in order to provide for a proper continuity of operation of the apparatus it is necessary to secure the end of another strip coil to the end of the first mentioned completely unwound coil, without stopping the progress of the first strip through the apparatus.

This may be accomplished by the use of the welder C by clamping the first strip end by means of the gripping device 14" on the side of the frame 14 next to the furnace E, thereby pulling the entire traveling welder along the track 16 at whatever speed the gripped strip end may have. During or before this operation, the end of a new strip coil is unwound from the coil box A and passed through the leveler B and the other open gripping device 14″ on the side of the traveling welder near the leveler B so that it overlaps the aforesaid gripped end of the first strip, after which the other gripping device is clamped down upon the end of the second strip, thereby pulling the second strip along at the speed of the first strip and the traveling welder being drawn thereby. The overlapping strips thus being clamped between the gripping device 14″ and to the welder 14, the strips and the electrodes of the welder are stationary with respect to each other and the welding electrodes may be operated in a usual manner to make a spot weld connecting the ends of the first and second strips to each other, without having stopped the progress of the first strip through the continuous annealing apparatus. After the weld has been made the gripping device may be unclamped and the traveling welder wheeled back on the track 16 for joining the ends of successive strips to each other as aforesaid.

The welder C may be used for relatively narrow strips which may be secured to each other with one weld but for securing the ends of relatively wide strips to each other it is desirable to provide a plurality of spot welds spaced transversely across the strips, for which the improved welder C′ is particularly adapted, and which of course may be used also to accomplish the results which may be effected by the use of the welder C.

That is to say, in the continuous pickling apparatus illustrated in Fig. 2, which may include a coil box A, a strip leveler B, a traveling welder C′, a pickling tank G, a washing tank H and suitable supporting rolls R, the strip end 19 of one strip, which has been uncoiled from the coil in the coil box A and which is progressing through the continuous pickling apparatus, may be gripped by one of the gripping means 44 nearest the pickling tank, so that the end is spaced between the electrodes 20 and 20′ and the gripped strip draws the traveling welder along at the speed of the strip; while another strip end 19′ of a second fully round coil is passed from the coil box through the strip leveler B and the unclamped gripping means 44 nearest the strip leveler so as to overlap the aforesaid strip end 19 and be spaced between the electrodes, the gripping means being operated by energizing the magnets 45 to pull the strips and upper gripping plates 49 against the magnets. The ends 19 and 19′ are thus overlapped between the electrodes and gripped to the welder so that the welder is drawn along with the moving strips.

The operator may then make a spot weld for joining the overlapping strips to each other by depressing the foot pedal 22 in the usual manner to impinge the electrodes upon the overlapped strips for closing the welding circuit, heating the strips and providing the necessary pressure by means of the electrodes for making the welds.

After making one weld the operator may then turn the hand wheel 41 in the proper direction for actuating the chain belt and sprocket gearing 42 to transversely slide the welder frame 21 in the desired direction to transversely space the line of action of the welding electrodes a suitable distance from the first weld for making a pair of transversely spaced spot welds for securing the overlapping wide strips to each other, by a second depression of the foot pedal 22, the welding machine being drawn along the track 30 at the speed of the gripped strips during all of the welding operations.

Successive repetitions of the above described cycle of operation for the welding machine provide means for making a plurality of transversely spaced welds upon overlapped strips moving in a direction angular to a line connecting the transverse spaced welds.

A modified form of strip gripping mechanism illustrated in Fig. 6 and indicated generally at 44′ and adapted for hand-operation may, if desired, be provided instead of an electro-magnetically operated mechanism 44, at each of the strip receiving and delivery ends 34′ and 34″ of the table 34.

Each hand-operating strip gripping mechanism includes stationary bottom grip plates 45′ secured at the level of the table 34 as by bolts 46 to transverse table end channels 47, which are connected to the legs 36 as by angle brackets 48.

Upper gripping plates 49 are operatively mounted above the stationary plates 45 as by means of upwardly extending guide bars 50, secured at their lower ends 51, as by upsetting to plates 49, and being provided with threaded upper ends 52. The guide bars 50 extend through guide apertures 53 in a cross plate 54 secured as by bolts 55 and angles 56 to extensions 36ª of the table legs 36 projecting a suitable distance above the upper level of the table.

Spring supporting means for the guide bars 50 are provided, which may include compression springs 54′ abutting at their lower ends the lower surface of the cross plate 54, and at their upper ends the washers 55′, strung upon the bolts. Nuts 57 screwed upon the threaded upper ends 52 of the bolts, abut upon the other sides of the washers 55′ for supporting the bolts and for providing a variable compression of the springs.

The gripping plates 45′ and 49 may be provided with removable face plates 45ª′ and 49ª secured to the plates 45′ and 49 as by means of countersunk bolts 58.

Upon the upper surface of the plate 49 and between the bolts 50 a cam block 64 is secured for cooperating with an eccentric 65 provided with bearing ends 66 suitably journaled in the upper extension 36ª of the table legs 36. One bearing end of each eccentric extends beyond the table and is provided with a hand-operating crank 64 secured thereto.

When the welding machine is provided with the hand-operated strip gripping mechanism 44' as aforesaid, the operation of the apparatus is very similar to its operation when provided with electro-magnetic strip gripping mechanisms 44, excepting that the strips are gripped by the operator turning by hand the cranks 67 of the hand-operated mechanisms 44' instead of passing an electric current through the gripping magnets of the mechanisms 44.

We claim:—

1. A welding machine including a reciprocating carriage, welding means operatively mounted upon the carriage, and strip gripping means operable independent of the welding means, and connected to the carriage.

2. A welding machine including a reciprocating carriage, welding means operatively mounted upon the carriage and a plurality of strip gripping means operable independent of the welding means and connected to the carriage.

3. A welding machine including a movable carriage, welding means operatively mounted upon the carriage and transversely movable thereon and strip gripping means operable independent of the welding means and connected to the carriage.

4. A welding machine including a movable carriage, welding means operatively mounted upon the carriage and transversely movable thereon and a plurality of strip gripping means operable independent of the welding means and connected to the carriage.

5. A welding machine including a reciprocating carriage, welding means operatively mounted upon the carriage and a plurality of strip gripping means operable independent of each other and of the welding means and connected to the carriage.

In testimony that we claim the above, we have hereunto subscribed our names.

HARRY M. NAUGLE.
ARTHUR J. TOWNSEND.